US009626834B2

(12) United States Patent
Acres

(10) Patent No.: US 9,626,834 B2
(45) Date of Patent: Apr. 18, 2017

(54) METHOD FOR DISPLAYING GAMING RESULT

(71) Applicant: Patent Investment & Licensing Company, Las Vegas, NV (US)

(72) Inventor: John F. Acres, Las Vegas, NV (US)

(73) Assignee: PATENT INVESTMANT & LICENSING COMPANY, Las Vegas, NV (US)

( * ) Notice: Subject to any disclaimer, the term of this patent is extended or adjusted under 35 U.S.C. 154(b) by 0 days.

(21) Appl. No.: 15/090,824

(22) Filed: Apr. 5, 2016

(65) Prior Publication Data

US 2016/0217658 A1 Jul. 28, 2016

Related U.S. Application Data

(60) Division of application No. 14/218,449, filed on Mar. 18, 2014, now Pat. No. 9,330,535, which is a continuation of application No. 12/619,499, filed on Nov. 16, 2009, now Pat. No. 8,696,436.

(51) Int. Cl.

| | |
|---|---|
| ***G06F 9/24*** | (2006.01) |
| ***G07F 17/32*** | (2006.01) |
| ***G07F 17/34*** | (2006.01) |

(52) U.S. Cl.

CPC ...... *G07F 17/3258* (2013.01); *G07F 17/3211* (2013.01); *G07F 17/3227* (2013.01); *G07F 17/3244* (2013.01); *G07F 17/3272* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 3,684,290 | A | 8/1972 | Wayne |
| 3,751,040 | A | 8/1973 | Carey |
| 4,240,635 | A | 12/1980 | Brown |
| 4,283,709 | A | 8/1981 | Lucero et al. |
| 4,433,844 | A | 2/1984 | Hooker et al. |
| 4,620,707 | A | 11/1986 | Lippincott |

(Continued)

FOREIGN PATENT DOCUMENTS

| | | | |
|---|---|---|---|
| CA | 2 442 442 | C | 10/1998 |
| EP | 0 141 264 | A2 | 5/1985 |

(Continued)

OTHER PUBLICATIONS

Acres, John, Measuring the Player Experience: What a Squiggly Line Can Tell You, Inside Edge / Slot Manager, Jan./Feb. 2009, pp. 28-29.

(Continued)

*Primary Examiner* — Paul A D'Agostino

(74) *Attorney, Agent, or Firm* — Marger Johnson

(57) ABSTRACT

Embodiments of the invention include a gaming device that has a video display. When the player initiates the game, an animation is shown. If the game had a losing outcome, the animation is very short and allows the player to quickly try for a win. If instead the game has a winning outcome the gaming device spins reels or otherwise shows the player how much he or she has won. The animation may also indicate progress toward a mystery jackpot or a group mystery jackpot.

4 Claims, 14 Drawing Sheets

(56) References Cited

U.S. PATENT DOCUMENTS 4,652,998 A 3/1987 Koza et al.
4,712,799 A 12/1987 Fraley
4,837,728 A 6/1989 Barrie et al.
4,911,449 A 3/1990 Dickinson et al.
5,026,058 A 6/1991 Bromley
5,046,736 A 9/1991 Bridgeman et al.
5,123,649 A 6/1992 Tiberio
5,560,603 A * 10/1996 Seelig ................. G07F 17/3211 273/143 R
5,655,965 A 8/1997 Takemoto et al.
5,720,662 A 2/1998 Holmes et al.
5,758,875 A 6/1998 Giacalone, Jr.
5,828,662 A 10/1998 Singkomrat et al.
6,045,129 A 4/2000 Cooper et al.
6,077,163 A 6/2000 Walker et al.
6,110,041 A 8/2000 Walker et al.
6,203,429 B1 * 3/2001 Demar .................... G07F 17/32 273/143 R
6,254,483 B1 7/2001 Acres
6,287,194 B1 * 9/2001 Okada ..................... G07F 17/32 273/139
6,315,662 B1 * 11/2001 Jorasch ................... G07F 17/32 463/16
6,315,666 B1 * 11/2001 Mastera .............. G07F 17/3211 463/20
6,443,456 B1 9/2002 Gajor
6,471,588 B2 10/2002 Sakamoto
6,558,255 B2 5/2003 Walker et al.
6,620,044 B1 * 9/2003 Okada ................. G07F 17/3227 273/143 R
6,634,922 B1 10/2003 Driscoll et al.
6,695,700 B2 2/2004 Walker et al.
6,702,670 B2 3/2004 Jasper et al.
6,739,973 B1 * 5/2004 Lucchesi ................. G07F 17/32 463/16
6,780,104 B2 8/2004 Fox
6,878,064 B2 4/2005 Huang
6,939,227 B2 9/2005 Jorasch et al.
6,939,229 B2 9/2005 McClintic
7,037,195 B2 5/2006 Schneider et al.
7,105,736 B2 9/2006 Laakso
7,125,333 B2 10/2006 Brosnan
7,160,188 B2 1/2007 Kaminkow et al.
7,160,189 B2 1/2007 Walker et al.
7,201,654 B1 4/2007 Jarvis et al.
7,258,613 B2 8/2007 Lucchesi et al.
7,303,475 B2 12/2007 Britt et al.
7,355,112 B2 4/2008 Laakso
7,374,486 B2 5/2008 Baerlocher
7,458,892 B2 12/2008 Walker et al.
7,585,222 B2 9/2009 Muir
7,594,849 B2 9/2009 Cannon
7,628,691 B2 12/2009 Luciano et al.
7,806,761 B2 10/2010 Walker et al.
7,874,911 B2 1/2011 Walker et al.
7,963,844 B2 6/2011 Walker et al.
7,980,934 B2 7/2011 Shuster et al.
8,047,908 B2 11/2011 Walker et al.
8,057,294 B2 * 11/2011 Pacey ..................... G07F 17/32 273/138.1
8,186,682 B2 5/2012 Amaitis et al.
8,197,324 B2 6/2012 Walker et al.
8,475,254 B2 7/2013 Acres
2001/0049298 A1 * 12/2001 Bennett ............... G07F 17/3244 463/16
2002/0082076 A1 6/2002 Roser et al.
2002/0142815 A1 10/2002 Candelore
2002/0147040 A1 10/2002 Walker et al.
2003/0017865 A1 1/2003 Beaulieu et al.
2003/0078101 A1 4/2003 Schneider et al.
2003/0114217 A1 6/2003 Walker et al.
2003/0119576 A1 6/2003 McClintic et al.
2003/0130042 A1 7/2003 Ollins
2003/0137109 A1 7/2003 Vancura
2003/0190944 A1 10/2003 Manfredi et al.
2003/0199292 A1 * 10/2003 Greenberg .......... G07F 17/3295 463/1
2003/0220138 A1 11/2003 Walker et al.
2003/0232640 A1 * 12/2003 Walker .................... G07F 17/32 463/16
2004/0002388 A1 1/2004 Larsen et al.
2004/0048655 A1 * 3/2004 Yoshioka ............ G07F 17/3262 463/23
2004/0248642 A1 12/2004 Rothschild
2005/0119052 A1 6/2005 Russell et al.
2005/0215314 A1 9/2005 Schneider et al.
2005/0227760 A1 10/2005 Vlazny et al.
2005/0239541 A1 10/2005 Jorasch et al.
2005/0282613 A1 * 12/2005 Pryzby ................ G07F 17/3227 463/20
2006/0025207 A1 2/2006 Walker et al.
2006/0052153 A1 3/2006 Vlazny et al.
2006/0068903 A1 3/2006 Walker et al.
2006/0105836 A1 5/2006 Walker et al.
2006/0148559 A1 7/2006 Jordan et al.
2006/0160598 A1 7/2006 Wells et al.
2006/0160610 A1 7/2006 Potts
2006/0205468 A1 * 9/2006 Saffari .................... G07F 17/32 463/16
2006/0211496 A1 9/2006 Manz
2006/0229127 A1 10/2006 Walker et al.
2006/0237905 A1 10/2006 Nicely et al.
2006/0240890 A1 10/2006 Walker et al.
2006/0247031 A1 11/2006 Walker et al.
2006/0252510 A1 11/2006 Walker et al.
2006/0252512 A1 11/2006 Walker et al.
2006/0252519 A1 11/2006 Walker et al.
2006/0287075 A1 12/2006 Walker et al.
2007/0001396 A1 1/2007 Walker et al.
2007/0010315 A1 * 1/2007 Hein ................... G07F 17/3244 463/20
2007/0015564 A1 1/2007 Walker et al.
2007/0021202 A1 * 1/2007 Matsumoto ............... A63F 7/02 463/30
2007/0049369 A1 3/2007 Kuhn et al.
2007/0060254 A1 3/2007 Muir
2007/0060274 A1 3/2007 Rowe et al.
2007/0060295 A1 3/2007 DeMar et al.
2007/0060323 A1 * 3/2007 Isaac ................... G07F 17/3202 463/29
2007/0060334 A1 3/2007 Rowe
2007/0066377 A1 3/2007 Asdale
2007/0087822 A1 4/2007 Van Luchene
2007/0105612 A1 5/2007 Fotevski
2007/0105615 A1 5/2007 Lind
2007/0106553 A1 5/2007 Jordan et al.
2007/0111772 A1 5/2007 Shuster et al.
2007/0180371 A1 8/2007 Kammier
2007/0184896 A1 8/2007 Dickerson
2007/0205556 A1 9/2007 Roemer et al.
2007/0218974 A1 * 9/2007 Patel ................... G07F 17/3244 463/20
2007/0254732 A1 11/2007 Walker et al.
2007/0281775 A1 12/2007 Kashima
2008/0004101 A1 * 1/2008 Hein ....................... G07F 17/32 463/20
2008/0026826 A1 1/2008 Groswirt
2008/0070695 A1 3/2008 Baerlocher et al.
2008/0096632 A1 4/2008 Okada
2008/0096636 A1 4/2008 Power
2008/0102946 A1 5/2008 Amour
2008/0113727 A1 * 5/2008 Vallejo ................ G07F 17/3258 463/17
2008/0113749 A1 5/2008 Williams et al.
2008/0113777 A1 * 5/2008 Anderson ........... G07F 17/3244 463/25
2008/0132328 A1 6/2008 Yoshioka
2008/0139305 A1 * 6/2008 Vallejo ................ G07F 17/3244 463/27
2008/0153580 A1 6/2008 Beadell et al.
2008/0161085 A1 7/2008 Hansen
2008/0161099 A1 7/2008 Sines et al.

(56) References Cited

U.S. PATENT DOCUMENTS

| | | | | |
|---|---|---|---|---|
| 2008/0182655 | A1 | 7/2008 | DeWaal et al. | |
| 2008/0220852 | A1* | 9/2008 | Olive | G07F 17/34 463/21 |
| 2008/0220861 | A1 | 9/2008 | Okada | |
| 2008/0242394 | A1 | 10/2008 | Sakuma | |
| 2008/0280674 | A1 | 11/2008 | Sakuma | |
| 2008/0287186 | A1 | 11/2008 | Sakuma | |
| 2008/0318656 | A1 | 12/2008 | Walker et al. | |
| 2008/0318686 | A1* | 12/2008 | Crowder | G07F 17/32 463/42 |
| 2009/0048012 | A1* | 2/2009 | Patel | G07F 17/3211 463/20 |
| 2009/0075712 | A1* | 3/2009 | Englman | G07F 17/32 463/17 |
| 2009/0117981 | A1 | 5/2009 | Yoshizawa | |
| 2009/0137312 | A1 | 5/2009 | Walker et al. | |
| 2009/0176558 | A1* | 7/2009 | Englman | G07F 17/32 463/25 |
| 2009/0197665 | A1* | 8/2009 | Christensen | G07F 17/32 463/20 |
| 2009/0233682 | A1 | 9/2009 | Kato et al. | |
| 2009/0270168 | A1* | 10/2009 | Englman | G07F 17/32 463/27 |
| 2009/0275389 | A1* | 11/2009 | Englman | G07F 17/3267 463/20 |
| 2009/0325669 | A1 | 12/2009 | Kelly et al. | |
| 2009/0325670 | A1 | 12/2009 | Kelly et al. | |
| 2010/0056248 | A1 | 3/2010 | Acres | |
| 2010/0075741 | A1 | 3/2010 | Aoki et al. | |
| 2010/0130280 | A1 | 5/2010 | Arezina et al. | |
| 2010/0197384 | A1* | 8/2010 | Wright | G07F 17/3258 463/26 |
| 2010/0285867 | A1 | 11/2010 | Okada | |
| 2011/0053675 | A1 | 3/2011 | Aoki et al. | |
| 2011/0081964 | A1 | 4/2011 | Acres | |
| 2011/0117987 | A1 | 5/2011 | Aoki et al. | |
| 2011/0118006 | A1* | 5/2011 | Acres | G07F 17/3227 463/25 |
| 2011/0183746 | A1* | 7/2011 | Englman | C08L 101/00 463/25 |
| 2011/0183753 | A1 | 7/2011 | Acres et al. | |
| 2011/0281632 | A1 | 11/2011 | Okada | |
| 2011/0294563 | A1 | 12/2011 | Jaffe | |
| 2012/0077565 | A1 | 3/2012 | Barbalet | |
| 2012/0115566 | A1 | 5/2012 | Fujisawa et al. | |
| 2012/0172108 | A1 | 7/2012 | Acres | |
| 2012/0172130 | A1 | 7/2012 | Acres | |
| 2012/0190425 | A1 | 7/2012 | Barbalet | |
| 2014/0106858 | A1* | 4/2014 | Constable | A63F 13/10 463/25 |
| 2014/0148230 | A1* | 5/2014 | Guase | G07F 17/3258 463/12 |

FOREIGN PATENT DOCUMENTS

| | | | |
|---|---|---|---|
| EP | 1 170 041 | A2 | 1/2002 |
| EP | 1 938 872 | A2 | 7/2008 |
| WO | 2005029279 | A2 | 3/2005 |
| WO | 2005029287 | A2 | 3/2005 |
| WO | 2005099841 | A1 | 10/2005 |
| WO | 2006104731 | A2 | 10/2006 |
| WO | 2006121663 | A2 | 11/2006 |
| WO | 2006135608 | A2 | 12/2006 |
| WO | 2008024556 | A2 | 2/2008 |
| WO | 2008024705 | A2 | 2/2008 |
| WO | 2008027429 | A2 | 3/2008 |

OTHER PUBLICATIONS

Acres, John, The Future of Gaming, Where Will You be in 10 Years?, Slot Operations Management / Casino Enterprise Management, Jul. 2007, pp. 8-10, 12.

* cited by examiner

METHOD FOR DISPLAYING GAMING RESULT

CROSS-REFERENCE TO RELATED APPLICATION

This application is a divisional of U.S. Non-Provisional application Ser. No. 14/218,449 filed Mar. 18, 2014, which is a continuation application of U.S. Non-Provisional application Ser. No. 12/619,499, filed Nov. 16, 2009, the contents of all of the foregoing applications being hereby incorporated by reference herein for all purposes.

FIELD OF THE INVENTION

This disclosure relates generally to gaming, and more particularly to showing outcomes to games in a time-efficient manner.

BACKGROUND

Gaming sessions typically include various winning gaming results and numerous losing gaming results. Each result is displayed on a gaming device. Since a portion of the winning gaming results are much larger in value than the wagers placed to reach those results, and because the overall payback percentage of the gaming device must be less than 100% to pay for the costs of operating the gaming device, including casino profit, those gaming sessions usually include many more losing gaming results than winning gaming results.

As a consequence of this reality, a great portion of time on the device is spent watching reels spin (or poker hands played) with a resulting loss. For most players the excitement and gratification of gambling is tied to achieving wins. While these players will endure certain periods of loss, players will often press the spin and/or bet buttons as quickly as possible to pass through the losses to get to another win. While the casino is interested to provide as much excitement and entertainment as possible to its players, the casino must also limit the number of wins to cover costs and return a profit, which effectively limits how many wins can be paid to a player.

In all of today's games, losses take as long or nearly as long as wins to display. While sometimes there is player anticipation tied to showing several reels with a particular symbol on a payline (or showing multiple cards needed for a large win in video poker) where the gaming result ultimately ends in a loss, most of the time it is quickly evident to the player that he or she has little or no chance of receiving a winning outcome. Once the player realizes that the current game will result in a loss, the player either has to wait for the remaining reels to come to rest or, in some games, can "slam" the rest of the reels to a stop by hitting the spin button again before waiting for the game to reset and being able to initiate another game. Thus, with conventional gaming devices, players often spend at least half of their gambling sessions waiting through losing gaming results.

Embodiments of the invention address these and other limitations in the prior art.

DETAILED DESCRIPTION

Figure 1A:
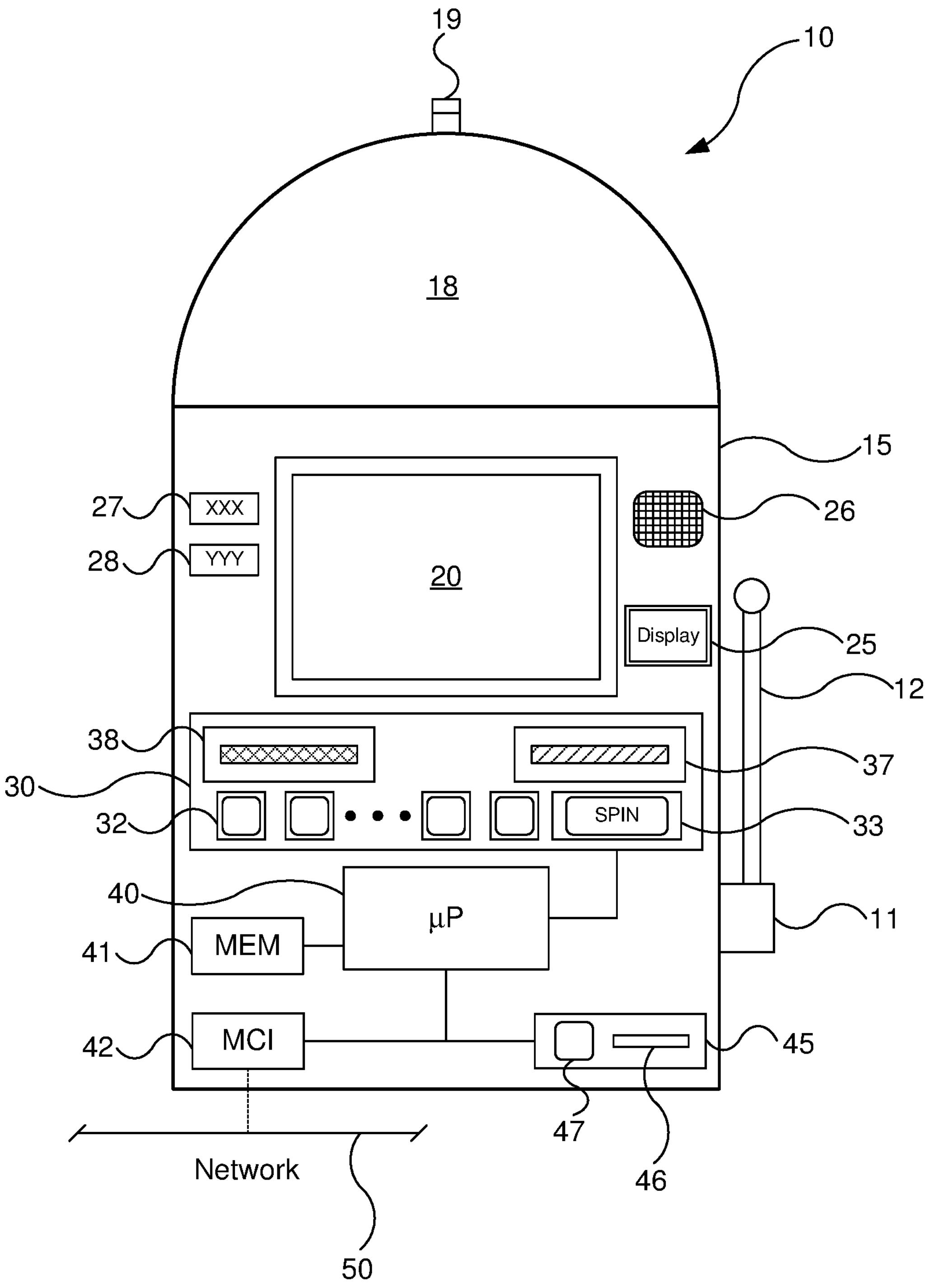
FIG. 1A is a functional block diagram that illustrates a gaming device according to embodiments of the invention.
Figure 1B:
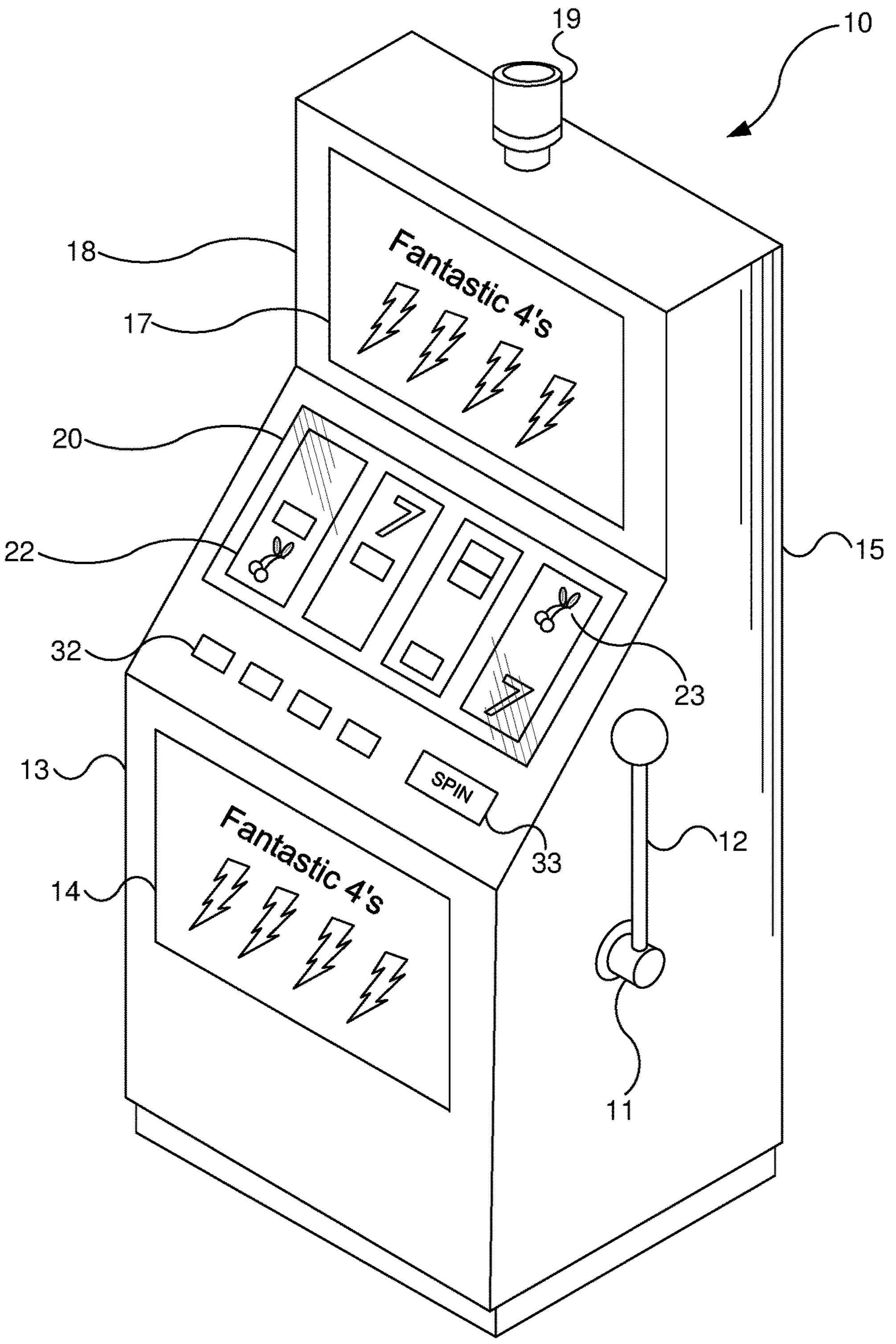
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
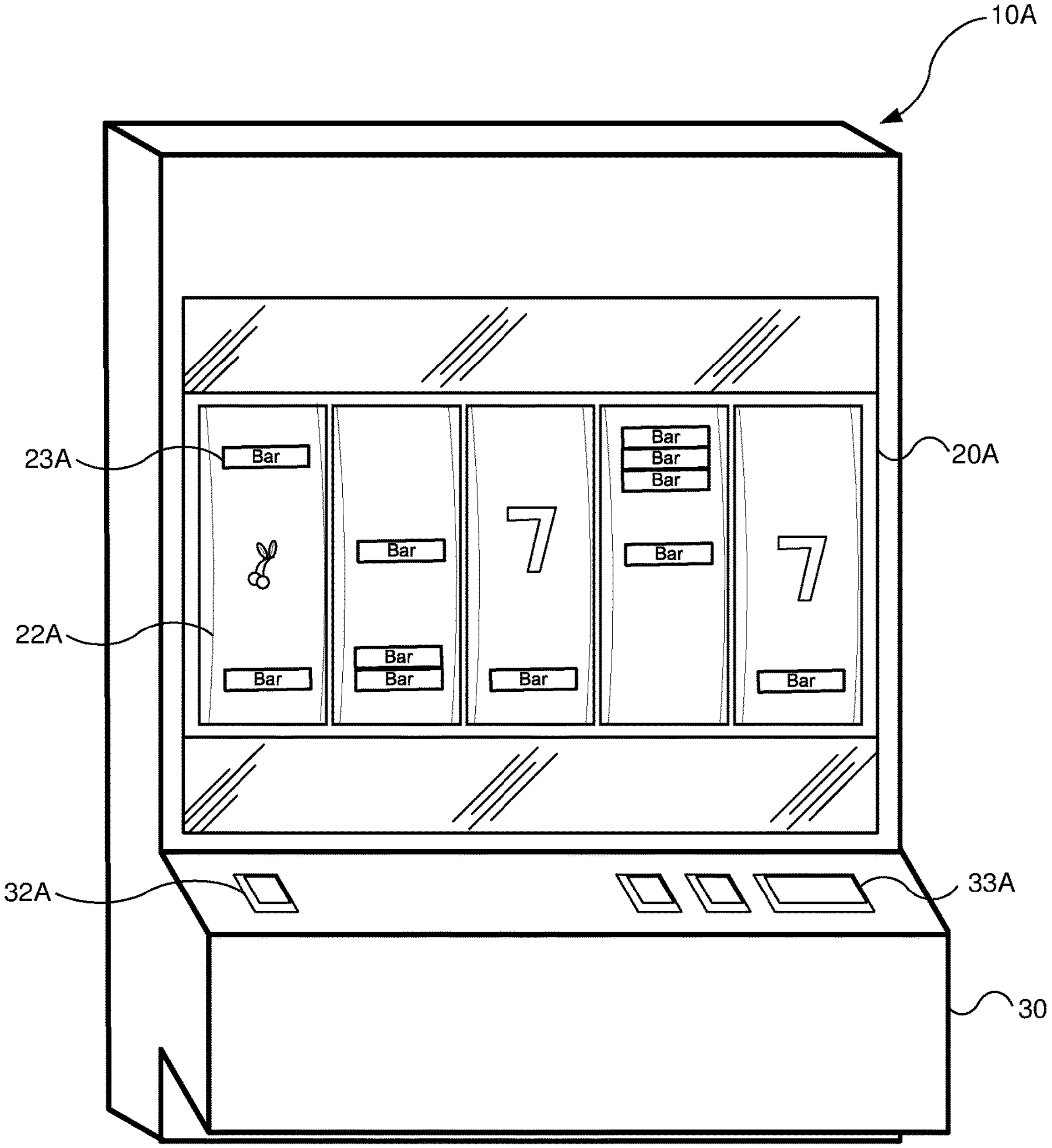
FIGS. 2A, 2B, and 2C are detail diagrams of exemplary types of gaming devices according to embodiments of the invention.
Figure 2B:
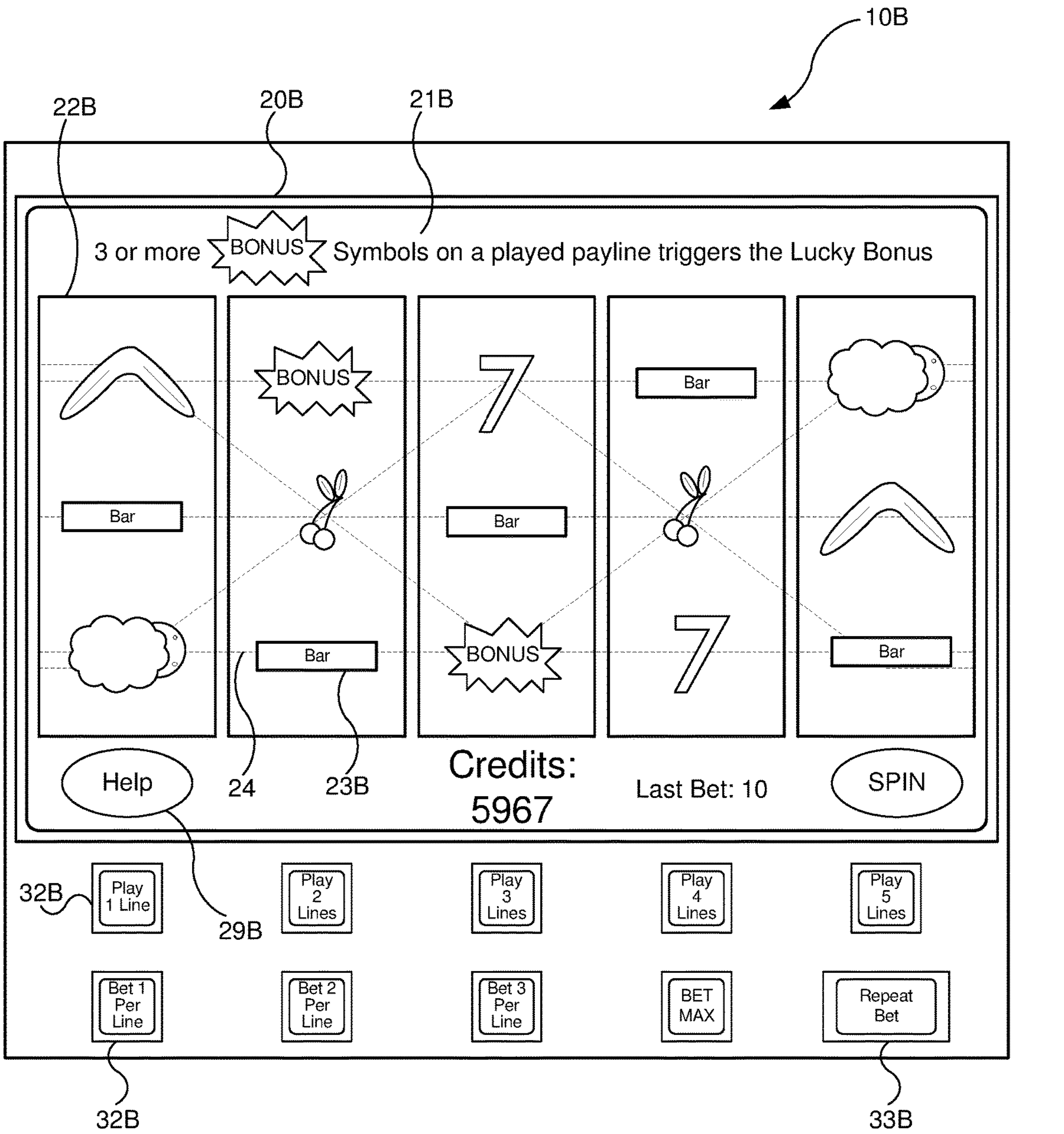
Figure 2C:
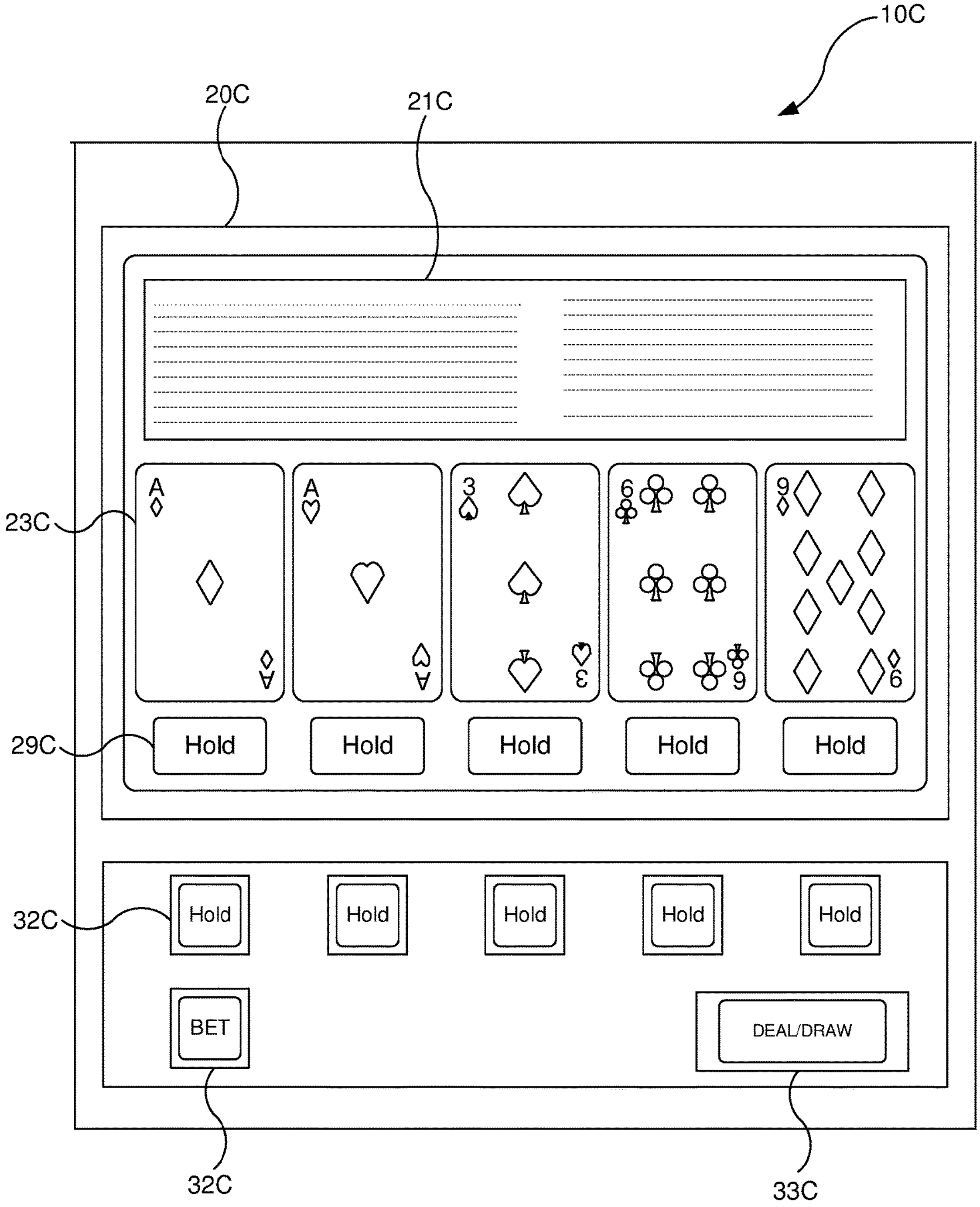

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty-two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
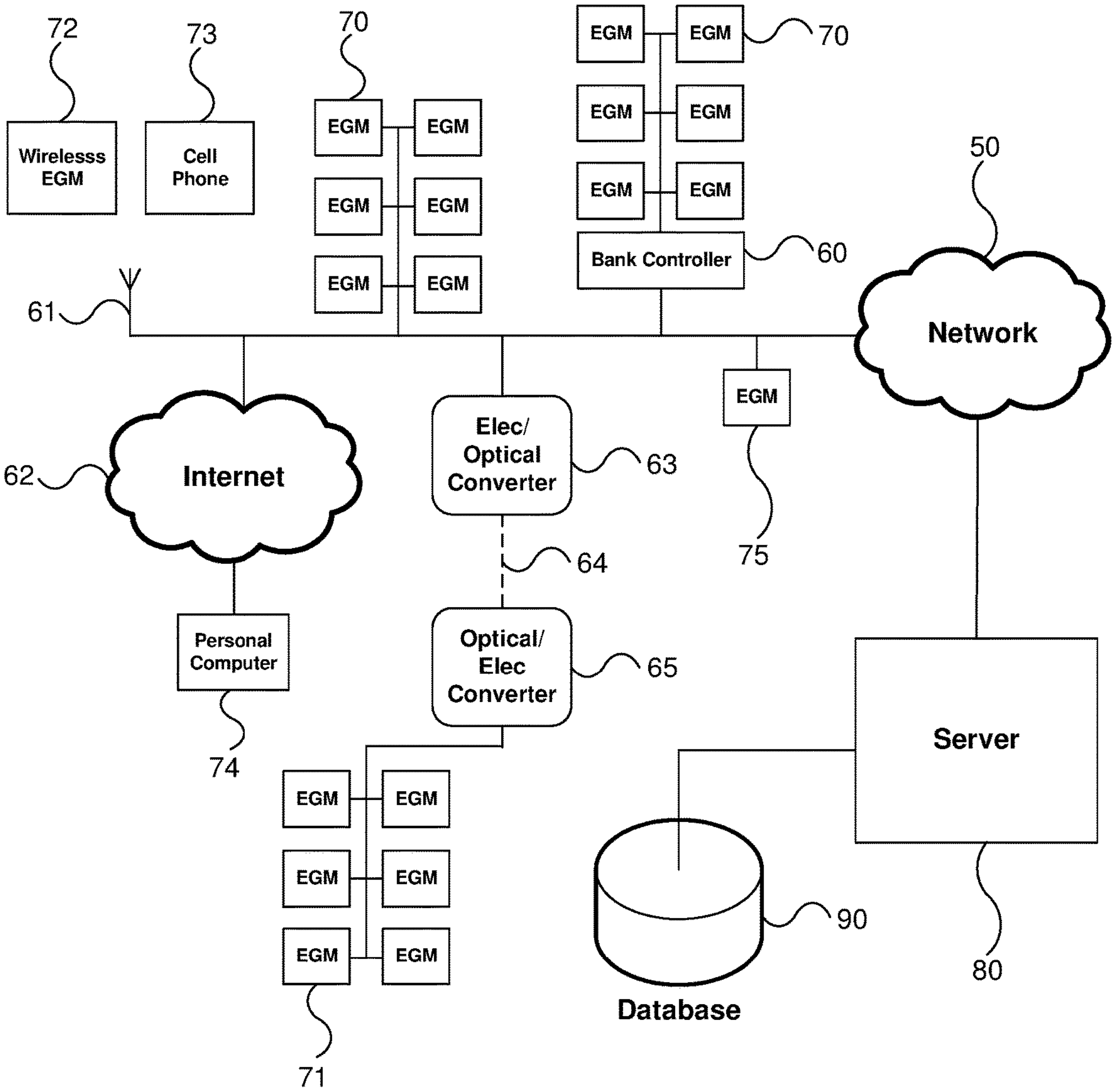
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4A:
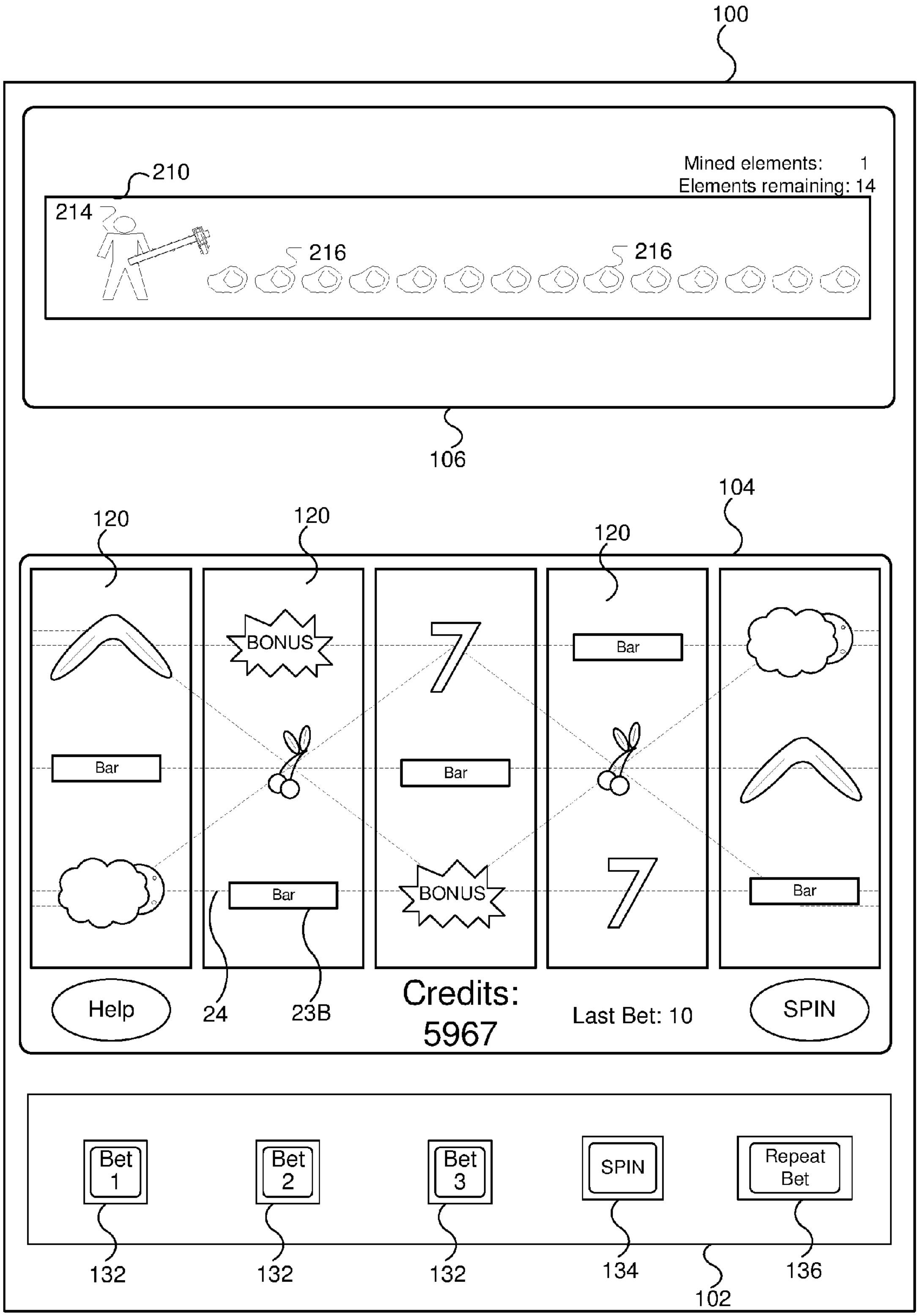
FIG. 4A is a block diagram of a gaming device including a main animation display and reel display according to embodiments of the invention.

FIG. 4A is a block diagram of a gaming device 100 including an animation screen according to embodiments of the invention. The gaming device 100 may be the same or similar to the gaming device 10 of FIG. 1. In this embodiment the gaming device 100 is operating as a stand-alone game, i.e., it does not interact with other games. However in other embodiments, such as those described below with reference to FIGS. 5A and 5B, the gaming device can operate in conjunction with other gaming devices.

With reference back to FIG. 4A, the gaming device 100 includes a player interaction section 102, a game detail display 104, and an animation screen 106. Either or both of the game detail display 104 and animation screen 106 may be CRT, LCD or other similar devices on the gaming device 100. Further, the game detail display 104 may include mechanical reels, such as described with reference to FIG. 2A above, or may include one or more video display screens depicting items other than reels, such as video poker screens or depictions of other typical games.

In this example, the animation screen 106 is illustrated as being in the top box 18 of the gaming device 10 of FIG. 1A, while the game detail display 104 is below, in the center portion of the gaming device 100. in this example, the game detail display 104 includes a set of animated reels 120, as well as indications for the payline 24, spin and help buttons, and a credit meter, all of which work as described above with reference to FIGS. 1A-FIG. 2C. A player interacts with the gaming device 100 through the player interaction panel 102, including wager buttons 132, a spin button 134, and a repeat bet button 136.

In operation, a player selects how much to wager through the wager buttons 132, then presses a spin button 134 or repeat bet button 136 to initiate the game on the gaming device 100. In the typical game, described above, after a player makes a wager and presses the game initiating button, the reels 120 spin or appear to spin through animation, and sequentially come to a stop. If the symbols on the reels 120 align with one of the paylines 24, credits are credited to the player. If, however, the reel symbols do not line with any payline, or, stated a different way, none of the wagered paylines 24 has a winning outcome, then nothing further happens.

In the embodiment illustrated in FIG. 4A, however, when the player initiates the game, such as by pressing the spin button 134 after having made an appropriate wager, an animated character such as the miner 214 illustrated in the animation screen 106 of FIG. 4A takes an action. In this example, the miner 214 swings his pickaxe at a symbol of a rock, illustrated as 216. In the most basic example, if the game has a losing outcome, then the animation screen 106 will illustrate the miner 214 taking a swing, striking the rock, and nothing else happening. The miner 214 then sets up for making his next strike, which won't be made until the next game is played. One advantage of using such an animation to convey the game outcome to the player is that it is very fast. Compared to the time spent to spin the reels 120, and allowing them to come to a stop, the animation described above may be able to be completed in ½, ¼, or even ⅒th the time. In some examples, the animation may complete in as little as 0.1-0.5 seconds. Other animations may take between 0.5 and 1.5 seconds.

In other embodiments, a losing outcome may be reported to the player by showing the losing animation described above on the animation screen 106 and additionally reporting the specific game outcome on the game detail display 104. In contrast to the typical reel-spinning sequence of a standard game, described above, the game outcome according to embodiments of the invention may be reported by showing a shortened or truncated outcome sequence on the game detail display 104. For instance, in an embodiment where the game detail display 104 is a set of physical reels, the losing outcome may be shown by quickly driving the reels to their ending stop locations by the relatively fast modern stepper motors. This can occur without the typical period of "free spin" of standard reels. The entire sequence of showing the result quickly may take place in as little as between 0.2 and 2 seconds. Embodiments where the game detail display 104 is a video screen may take place even faster, by simply showing a generated static display of the final outcome of the reel symbols or, in other embodiments, cards of a poker hand.

If instead the game outcome is a winning outcome, a different animation sequence is played in the animation screen 106. Specifically, the miner 214 strikes the rock 216, which opens to reveal a jewel or diamond inside. Such an animation is illustrated in the animation screen 107 of FIG. 4B. The winning animation may be accompanied by a winning audio sound, such as a high pitched "clink" that could be played out of speakers 26 of the gaming device (FIG. 1A), in contrast to a low pitched "clunk" played in the losing example.

After the animation in a winning outcome indicates to the player that the game has been won, the reels 120 in the game detail display 104 spin or are animated just as in a regular game. The main difference is, at least in some embodiments, if the reels 120 spin after a winning animation, the player knows that he or she will receive winning credits after the reels stop. In some embodiments, after a winning animation, the gaming device 100 prompts the player to initiate the spinning of the reels 120 by pressing, for example, the spin button 134. In other embodiments, the reels 120 initiate automatically.

In yet other embodiments, a winning outcome may be displayed more slowly in the game detail display 104 as compared to a standard game. For instance, if a typical spinning reel game, such as described above with reference to FIG. 2B, takes 3 seconds for all of the reels to be sequentially stopped, embodiments of the invention may stretch the time to display a winning game to 5 or 10 seconds, or even longer. This has an effect of prolonging the final award and building anticipation in the player who may realize that he or she has won the base game because of the winning animation display in the animation screen 106, but doesn't know the winning amount.

Although these embodiments are described with reference to spinning the reels 120 to report the specific game outcome and the game winnings, any system or method known in the art could alternatively be used. For instance, a poker hand could be revealed and the game paid according to the particular poker hand dealt.

In some embodiments, any jewel or prize revealed in the animation shown on the animation screen 106 is sized proportionate to the size of the game winnings. In other words, if the game has a winning outcome that is rather low, for instance 5 credits, the jewel uncovered by the miner 214 on the animation screen 106 will be comparatively small. In contrast, if the game outcome is a large number of credits, any jewel uncovered by the miner 214 will be comparatively larger. In some embodiments, the audio signal will change pitch or timbre based on the size of the game award. Although in such embodiments the player gets a preview of the relative size of the game winnings, anticipation still builds because each varying size translates to multiple possible credits won. In other words, a relatively small jewel may, when the winnings are revealed, signify an award to the player of between 1 and 10 credits, while the very largest jewel may indicate to the player that the ultimate award will be between one hundred and five hundred credits. Thus, merely because the miner 214 on the animation screen 106 strikes the largest jewel, there is still player anticipation as the player finds out exactly what he or she has won.

Figure 4B:
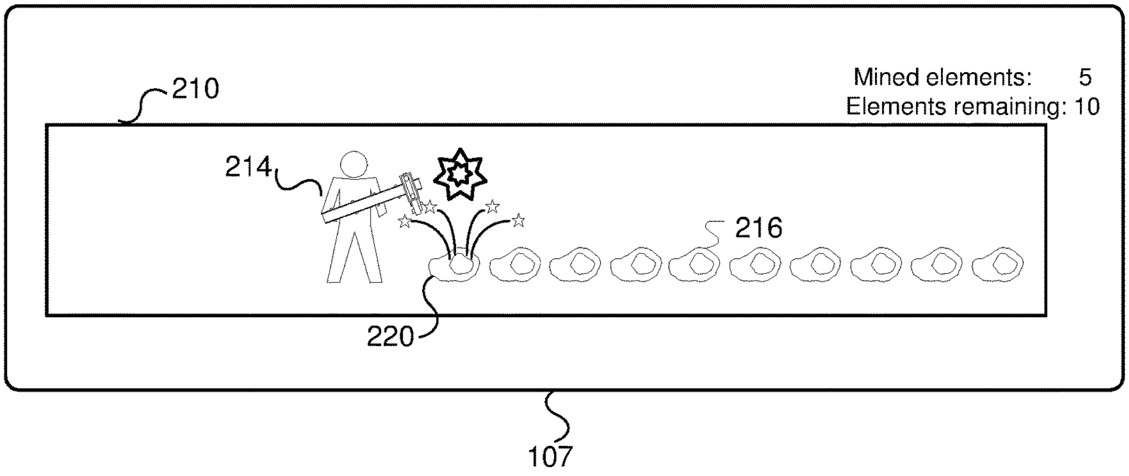
FIG. 4B is a block diagram of the animation display of FIG. 4A illustrating a winning animation.

Although there are a number of rocks 216 illustrated in the animation screen 106 of both FIGS. 4A and 4B, in some embodiments, there may only be one rock that takes up most or the entire animation screen. However, a player may get bored relatively quickly if every loss of the game is merely a quick animated pickaxe strike without anything further. In contrast, the animation screens 106 of FIGS. 4A and 4B change as a player plays more than one game. For instance, if a player plays multiple games, the miner 214 moves to the right as he opens more and more rocks 216 and the opened rocks disappear.

The animation screen 106 may serve a double function both as a way to indicate to the player the outcome of the game as well as to indicate to the player that he or she is are progressing toward a mystery bonus win. Graphical interfaces to mystery bonus wins are described in U.S. patent application Ser. No. 12/353,083, filed Jan. 13, 2009, entitled GRAPHICAL PROGRESS REPORT FOR GAMING DEVICE BONUS, which is incorporated by reference herein. By using the animation screen as a win proximity indicator in this manner, the player knows that, should the miner 214 cross all the way to the end of the animation screen 106, that regardless of game outcome, the player will win a mystery bonus. This could encourage further play and increased enjoyment from the player.

When the player wins a mystery bonus, it may appear the same or similar to winning the game. For example, winning in the individual game is indicated to the player by uncovering one of many sized diamonds, which are clear in color, from the rocks 216. Winning the mystery bonus could be indicated by uncovering a different colored jewel, such as a green emerald. Awarding the mystery bonus may be as simple as, in some embodiments, awarding a fixed value to the player. In other examples, a mystery bonus may be awarded to the player by spinning the reels and seeing the outcome of the paylines. Other bonuses are paid by having the player spin a wheel or play a separate, secondary game. Yet other examples are described with reference to FIGS. 5A and 5B below. Still other methods and systems to pay mystery awards or bonus awards are described in U.S. patent application Ser. No. 12/166,156, filed Jul. 1, 2008, entitled PLAYER BASED COMPENSATION, which is incorporated by reference herein.

Recall from above, that when the game is a losing outcome, that the miner 214 swings at the rock 216 relatively quickly and the game ends. It may become repetitive or boring for the player to continually press one of the game initiation buttons 134 or 136. Thus, in some embodiments, a new game will automatically restart if the preceding game ends in a losing outcome. Such techniques are described in U.S. patent application Ser. No. 12/204,633, filed Sep. 4, 2008, entitled GAMING DEVICE WITH VARIABLE PLAY SPEED, the teachings of which are incorporated herein.

The same animation display 106 described above can function simultaneously as both a game result animation screen as well as a grouped mystery bonus game. With reference back to FIG. 3, a bank controller 60 is coupled to a number of EGMs 70 all within the same bank. FIG. 3 also separately shows EGMs 70 coupled to one another in a bank without use of the bank controller 60. Some embodiments of the invention are best exemplified when a group of connected gaming devices 70 are located physically near one another, which can build excitement for the nearby players, as described below.

Figure 5A:
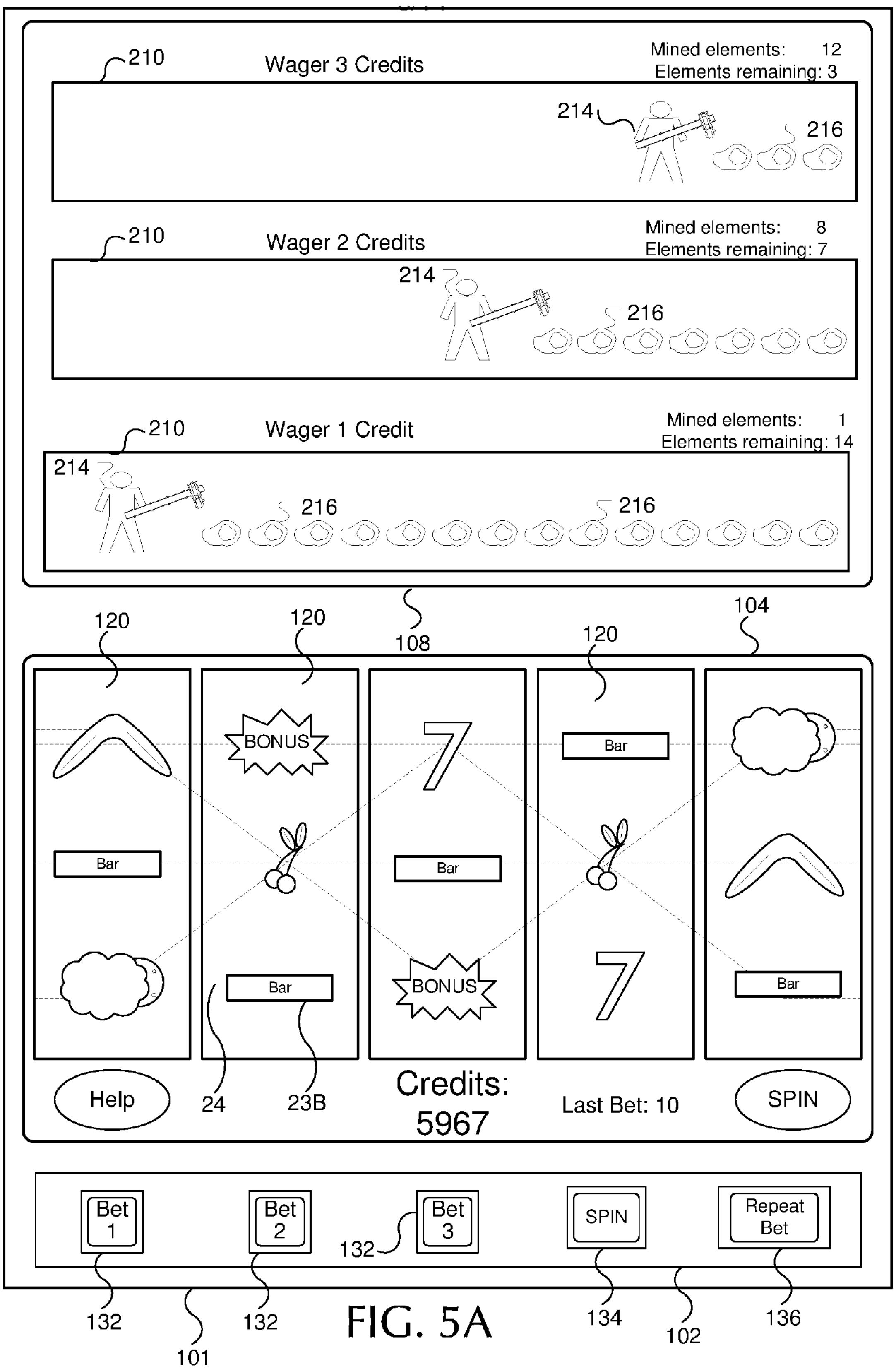
FIG. 5A is a block diagram of a gaming device illustrating according to embodiments of the invention operating in a group mode.

With reference to FIG. 5A, a device 101 includes an animation screen 108, which appears similar to the animation screen 106 of FIG. 4A. Differently, however, the animation screen 108 includes three separate sub animation screens 210, each illustrating the progress in a group mystery jackpot game.

In FIG. 5A, each of the sub-animation screens 210 aligns with one of the bet options of the game buttons 132. For example, one of the screens 210 is associated with the "bet-1" action. Thus, when the player presses the bet-1 button on the base game, or otherwise bets one credit, the miner 214 in the associated animation screen takes a swing. A losing game outcome is an extremely quick animation, while a winning outcome may be a longer animation, including reel spins, just as described above. In another embodiment, because time may be of the essence during the mystery bonus game, the reels of the reel screen may not spin at all, even when there is a winning outcome. In still other embodiments, there may be a relatively fast reel spin, or animated reel spin, as described above, even with a losing outcome. Still further embodiments may include the extended-time winning spin, longer than a normal win, also as described above. The player may be able to choose whether to animate wins while involved in a group mystery jackpot, or this decision may be up to the casino or game provider.

Figure 5B:
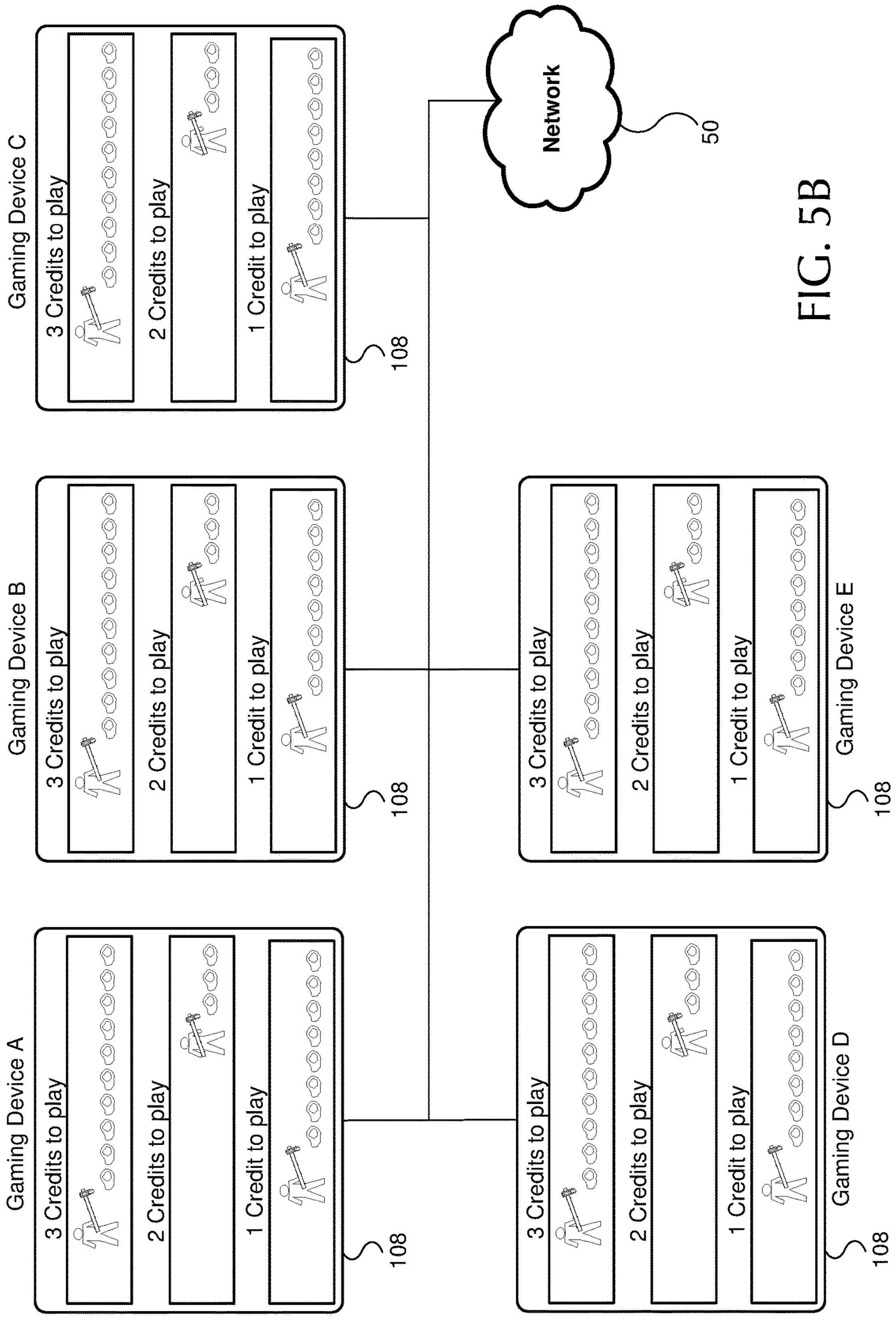
FIG. 5B is a block diagram showing multiple devices according to FIG. 5A according to embodiments of the invention.

Each of the sub-animation screens 210 indicates its present level by showing its associated number of rocks 216, as illustrated in FIG. 5A. With reference to FIG. 5B, each of the animation screens 108 of each of the devices 101 that are coupled to one another through the gaming network 50 and playing the mystery jackpot show the same or a similar animation. For example, if there are five gaming devices 101 coupled to one another, the animation screen 108 of each device conveys identical information, with the same number of rocks 216 in each sub-animation screen 210, as illustrated in FIG. 5B. When any of the players of the connected gaming devices 101 bet 1, one of the rocks on the bet-1 sub-animation screen 108 of every connected gaming device is decremented for all the players to see. Of course, as described above, it may take multiple swings of the pickaxe to actually remove one of the rocks 216, given their relatively few number.

In some embodiments on a casino floor, multiple separate mystery jackpot games could each be operating, simultaneously, one for each bank or bank portion of the connected gaming devices 70.

In the group mystery jackpot bonus, each of sub-animation screen 108 includes an individual trigger that, when satisfied by one of the players, causes the mystery jackpot to be awarded. The triggers may each be different and may be randomly (or pseudorandomly) set. The trigger of the mystery jackpot is guaranteed to be satisfied by the time all of the rocks 216 are removed for any of the sub-animation screens 108. In this way, graphical feedback is provided to the player of progress toward the mystery jackpot bonus.

In alternate embodiments, instead of including a separate account and sub-animation screen 108 for each of the "bet-x" options, where "x" stands for any of the possible wagers, embodiments of the invention may include a single counter that is incremented when any of the linked gaming devices makes any wager.

In operation, each of the players of the linked gaming devices plays the base game betting one through three credits as desired. If a player sees that one particular counter sub-animation screen 108 is running out of rocks 216, or if they are simply feeling lucky, they may bet an amount that corresponds to the particular screen 108. In other instances, the player may simply make the corresponding bet in the base game without reference to the mystery jackpot. Eventually, one of the players of the connected gaming devices will satisfy the corresponding trigger for one of the particular sub-animation screens 108. When that happens, an indicator, such as a sound, image, or series of images, or combination, may indicate to players of the connected gaming devices, or other players, that one of the players of the connected gaming devices has won the bonus. In some instances the animation will include the miner 214 finding an emerald or other jewel. In a preferred embodiment, the indicator that notifies that one of the players of the gaming devices has won the bonus does not immediately identify the winning player. Instead, the mystery jackpot sequence builds excitement by informing each of the players of the connected gaming devices that they may have won the mystery jackpot. Then the jackpot enters an identification phase, where the winning player is identified. Examples of identifying the winner and determining the winning bonus award are described in related co-pending U.S. patent application Ser. No. 12/272,630, filed Nov. 17, 2008, entitled BONUS FOR CONNECTED GAMING DEVICES, the teachings of which are incorporated herein by reference.

In some embodiments, the winner of the mystery jackpot determines the amount won by playing a separate game, such as a spinning a wheel, spinning the reels, or by other methods. In other embodiments the amount won in the mystery jackpot is simply credited to the appropriate device.

Figure 6A:
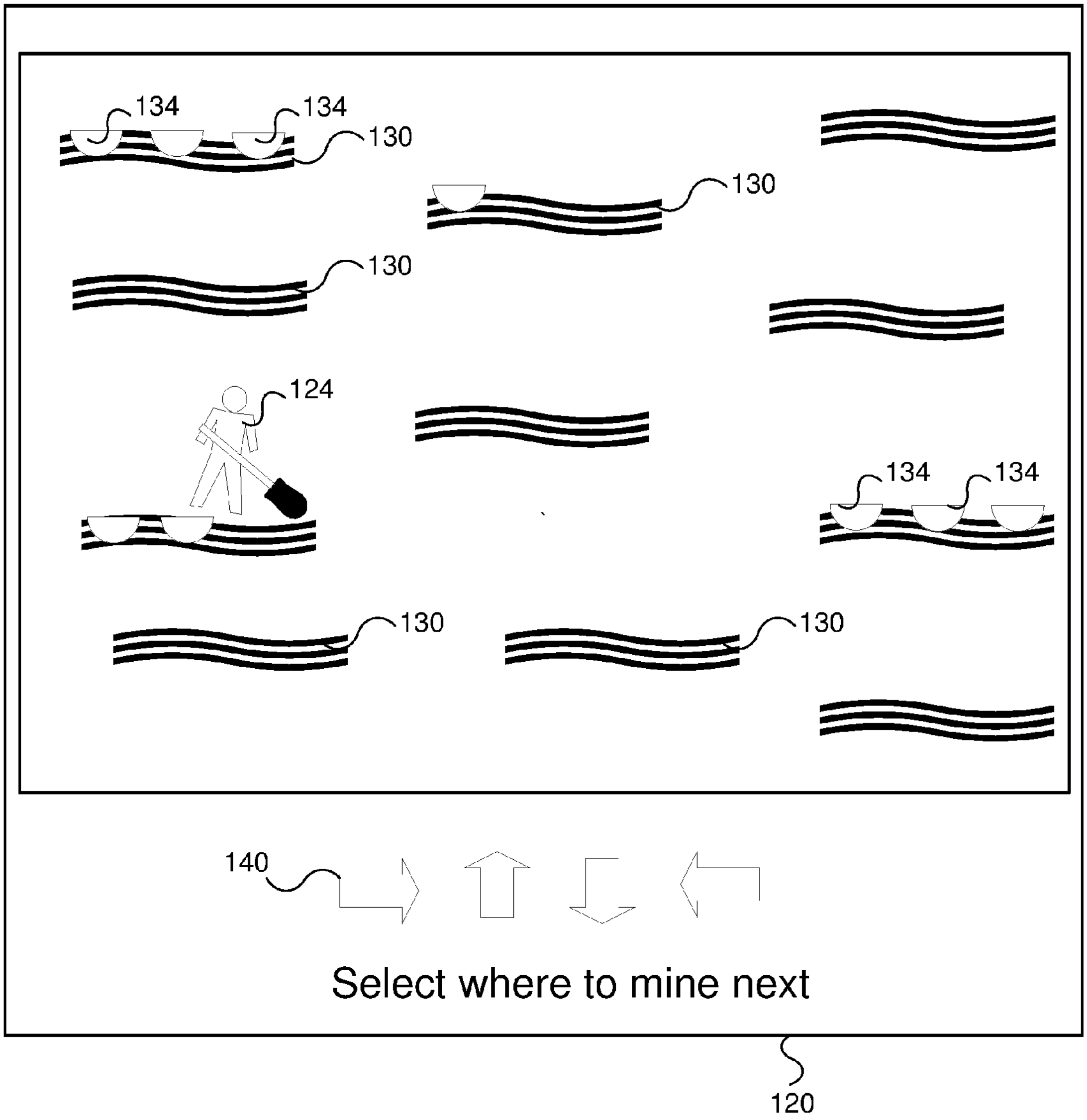
FIGS. 6A, 6B, and 6C are block diagrams of a gaming device including a main animation display according to other embodiments of the invention.
Figure 6B:
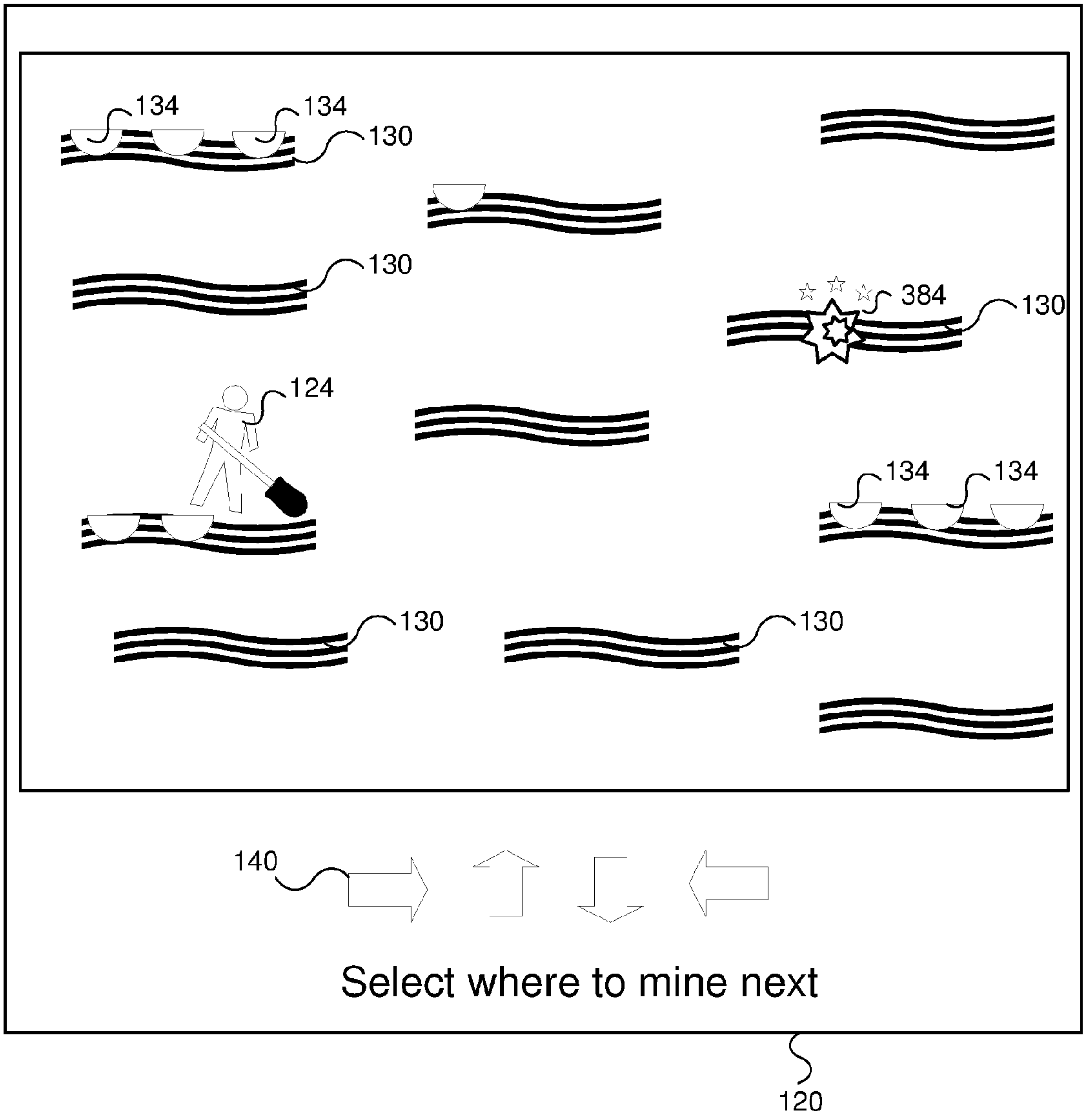
Figure 6C:
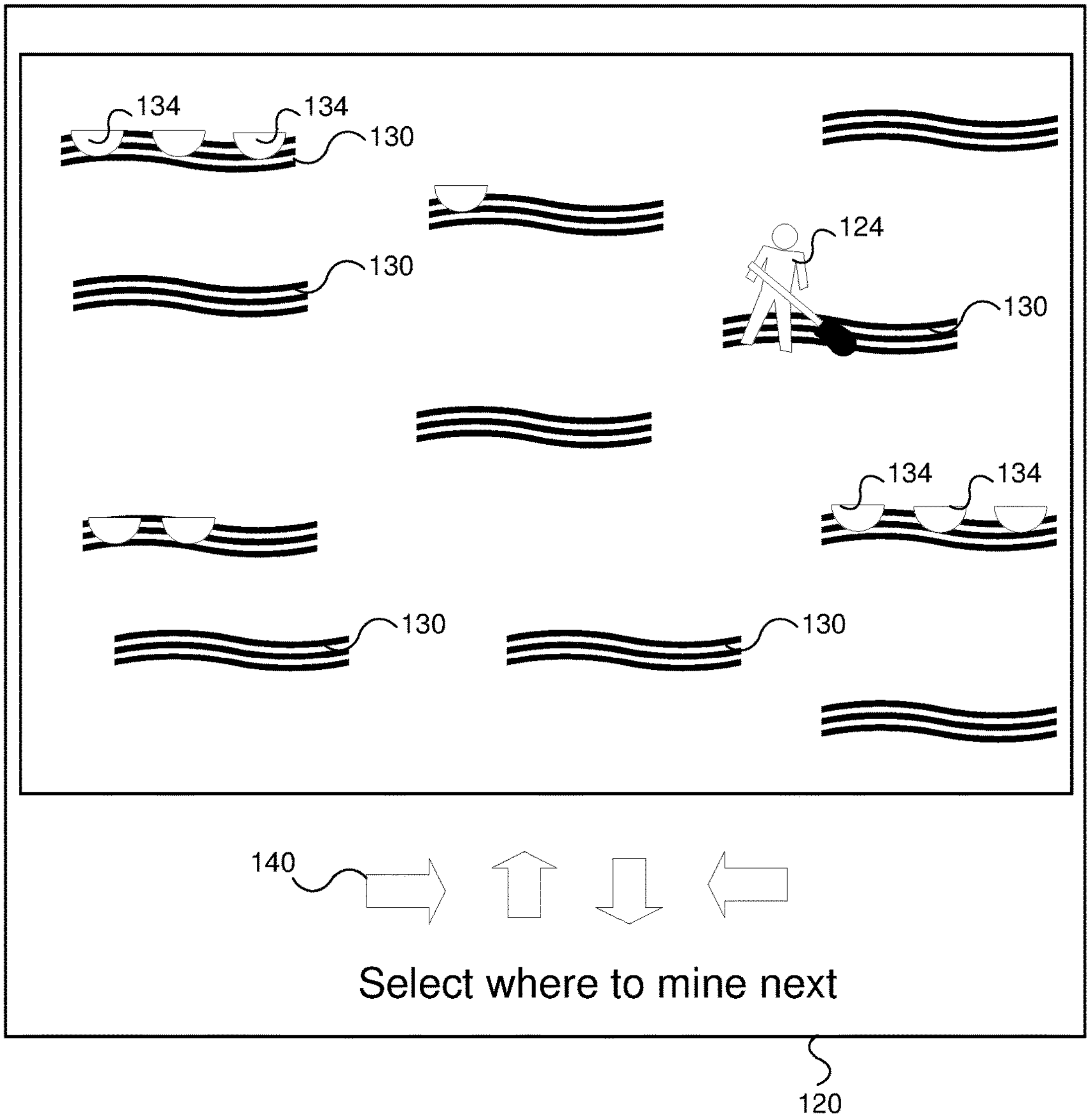

FIGS. 6A, 6B, and 6C illustrate a different animation sequence than those described above. With reference to FIG. 6A, animation screen 120 includes a central figure, in this case a pirate 124, who digs for treasure in various discrete lands 130. Of course, the actual animation characters or actions are merely representative and many character or character sequences would be appropriate to use to implement embodiments of the invention. In this animation sequence, the pirate 124 searches for treasure by digging in the lands 130. If treasure is found, which happens when there is a winning game outcome, or by winning a game or mystery bonus, the pirate 124 will find an animated piece of treasure. Then the game outcome is conveyed to the player by spinning the reels 120 as described above with reference to FIG. 4A. Different in this embodiment, however, is that the pirate 124 need not continue sequentially across a screen as the miner 214 did in FIG. 4A. In other words, the pirate 124 may meander throughout the animation screen 120 digging various holes 134 looking for treasure.

Because the pirate 124 is free to move about the animation screen 120, in some embodiments, the player may control the movements of the pirate. As part of the animation screen 120 or elsewhere on the gaming device 100, are a set of controls 140. The player may press the controls, for example up, down, right, and left to control where the player desires the pirate 124 to dig next. Providing such control to the player may keep the player interested and at the game. Recall that, just as with the miner 214 example given with reference to FIG. 4A, a game losing outcome invokes a very quick animation of the pirate 124, while a winning game outcome causes a different animation, for example, striking treasure. Either of these animations may be followed by or shown simultaneously with spinning or animating the reels in the game detail display 104 to display the game winnings, or lack thereof, to the player. Performing an unexpected action, such as a decoy animation where an animation on the game detail display yields zero credits when it typically indicates that a win is forthcoming, is a way to hold a player's interest in the game.

As the player is playing the game, one of the lands 130 may animate, as illustrated in FIG. 6B to provide the player a hint of where treasure may be located. As illustrated in FIG. 6B, stars or another animation 144 may spontaneously erupt from one or more of the lands 130 to signal to the player that there is treasure below. The revealing animation 144 may occur automatically, or for some other reason. For instance, the player may be able to purchase such a reveal for a nominal or non-nominal amount of credits or other value. At other times the reveal 144 may occur based on a game outcome. As illustrated in FIG. 6C, after the reveal 144, the smart player directs the pirate 124 to the particular land 130 that was revealed in the reveal process 144. In some embodiments, the treasure may be located somewhere within the land 130, although the player does not know exactly where it is. Such a technique can also be used to hold players attention or interest.

In all of the animations described above, the player may play multiple games before any progress is in an animation screen. For example, the miner 214 of FIG. 4A may take ten strikes at a rock 216 before the rock 216 is removed from the animation screen 106. Otherwise, due to the limited screen space on a device 100, there might not otherwise be enough games played before a mystery bonus is forced to be won by removing all of the rocks 216 on the screen.

The animation screen 120 of FIG. 6A can also operate as a win proximity indicator to a mystery bonus, such as those described above with reference to 4A. In this example, the progress toward a mystery is illustrated to the player by the increasing number of empty holes 134 left behind by the pirate 124. The player may be informed, or may learn for himself or herself that a mystery bonus must be awarded before all of the digging locations 134 are revealed in the lands 130.

The animation sequence illustrated in FIGS. 6A, 6B, and 6C may be used for stand-alone games, as described with reference to FIGS. 4A and 4B, or may be used in a group mystery jackpot as described with reference to FIGS. 5A and 5B. In a group mystery jackpot setting, there may be multiple pirates 124, one for each bet-multiple, and each having an isolated sets of lands 130. In other embodiments the multiple pirates 124 roam the entire screen and can dig at any of the lands 130. A bonus multiplier may be used to compensate for the different wager amounts for animating the pirates 124.

Figure 7:
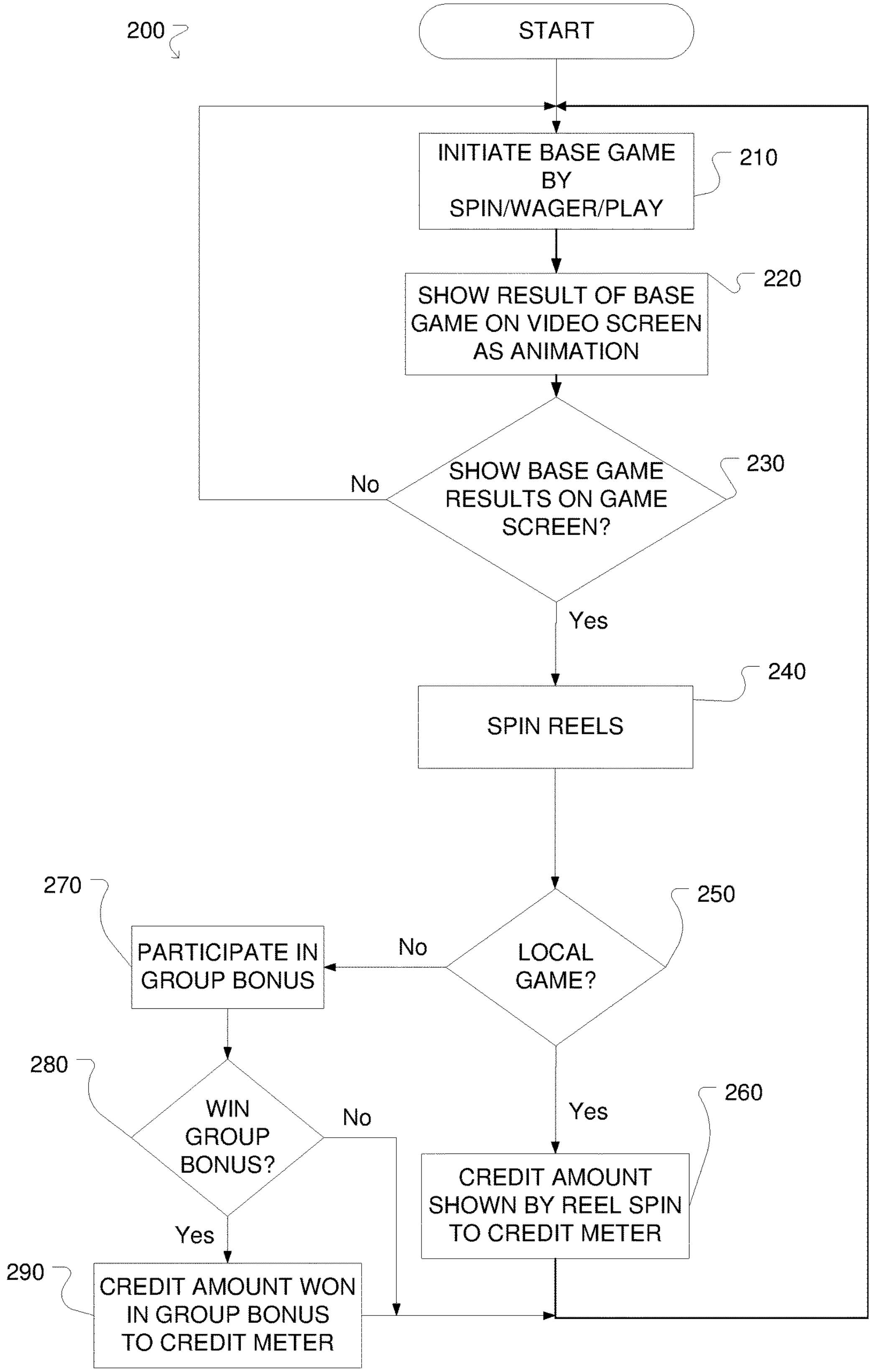
FIG. 7 is an example flow diagram showing an example process according embodiments to the invention.

FIG. 7 is an example flow diagram of a method to indicate a gaming result to a player according to embodiments of the invention. A flow 200 begins at a process 210 where the player initiates play on the base game. The initiation can be satisfied by receiving a signal that the player has pressed the wagering buttons, the spin button 134, or the repeat bet button 136, all of FIG. 4A or 5A. Next, the gaming result is shown on an animation screen in a process 220. As described above, a losing game outcome is displayed with a very quick animation sequence, while a winning game outcome may include a longer animation sequence. At a process 230, a decision determines whether to additionally show the results on the base game or game screen. In other words, the process 230 determines whether only the quick animation sequence or both the animation sequence and a separate game outcome sequence, such as spinning the reels of the base game, is shown to the player. If the game result is not shown on the base screen, then the flow 200 exits the decision block 230 in the NO direction, where a next game is ready to be played. Recall, that in some embodiments, a losing outcome automatically initiates the start of a new game.

If the process 230 exits in the YES direction, then the game result is additionally shown on the game screen, in a process 240. Next, a process 250 determines if the win result was a result of the local game, or another winning result. If the game is a local game, then a winning amount is added to the credit meter in a process 260. Then the flow 200 returns back to wait for an initiation of a next game.

If instead the process 250 exits in the NO direction, this indicates that the winning result animation was the result of a non-game win, for example, a bonus, a mystery bonus, or winning a group bonus. If so, the player may automatically participate in the group bonus sequence in a process 270, after which it is determined whether or not he or she was a winner. If the player won the group bonus, then the process 280 exits in the YES direction and additional credits from the group bonus are added to the meter of the game in a process 290. If instead, the player did not win the group bonus, flow 200 simply returns back to the beginning of the flow, to wait for initiation of another game.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of conducting a mystery jackpot on a network of connected gaming devices, comprising:

providing game play credits to a player of the gaming device in response to receipt of value from a player via at least one of a currency acceptor, a ticket acceptor, an electronic account, and a coin acceptor;

generating a graphical indication on a display on a screen at each of the connected gaming devices that indicates a movement of an icon between a start position and an end position, the mystery jackpot being awarded at least when the icon reaches the end position:

animating the icon each time a wager is made at one of the gaming devices:

moving the icon toward the end position as wagers are made at the gaming devices;

accepting a wager from the game play credits at one of the gaming devices jn response to a player actuated input at the gaming device;

initiating a game on the one gaming device in response to a player actuated input at the one gaming device;

animating the icon in a first manner on each screen when a game is initiated that indicates the game outcome is a winning outcome and animating the icon in a second manner when a game is initiated that indicates the game outcome is a losing outcome, display of the first manner being substantially longer than for the second manner, wherein the first and second manners of animation are displayed before the outcome of the game on the one gaming device; and animating the icon in a third manner on each screen when one of the gaming devices triggers the mystery jackpot award;

displaying the outcome of a winning game on the one gaming device for a substantially longer time than displaying the outcome of a losing game; and printing a ticket on a ticket printer associated with the gaming device that reflects the balance of the game play credits responsive to activation of an actuator associated with the gaming device.

2. The method of claim 1 further comprising providing the player of the game an opportunity to suppress the first and second manners of animation.

3. A gaming system comprising:

a plurality of gaming devices connected in a network, each gaming device including:

a housing;

a display device supported by the housing;

a plurality of input devices supported by the housing, the plurality of input devices including at least one of a currency acceptor, a ticket acceptor, and a coin acceptor and at least one of: a touch screen and at least one button;

a ticket printer for printing a ticket that reflects the balance of game play credits on the gaming device responsive to activation of an actuator associated with the gaming device; and an electronic processing device supported by the housing, the electronic processing device configured to operate with the display device and the plurality of input devices to: receive a monetary value that is reflected on a credit meter associated with the gaming device, receive, via at least one of the plurality of input devices, a wager based at least in part on the monetary value; and for a single play of a game on each gaming device;

accept a wager from the credits on the credit meter at one of the gaming devices in response to a player actuated input at the gaming device;

initiate a game in response to a player actuated input at the one gaming device;

generate a graphical indication on the display device at each of the connected gaming devices that indicates movement of an icon between a start position and an end position, the mystery jackpot being awarded at least when the icon reaches the end position;

animate the icon each time a wager is made at one of the gaming devices;

move the icon toward the end position as wagers are made at the gaming devices;

animate the icon in a first manner on each screen when a game is initiated that indicates the game outcome is a winning outcome and animating the icon in a second manner when a game is initiated that indicates the game outcome is a losing outcome, display of the first manner being substantially longer than for the second manner, wherein the first and second manners of animation are displayed before the outcome of the game on the one gaming device; and animate the icon in a third manner on each screen when one of the gaming devices triggers the mystery jackpot award; and display the outcome of a winning game on the one gaming device for a substantially longer time than displaying the outcome of a losing game.

4. A method of operating a gaming system having a plurality of gaming devices connected in a network, each gaming device including:

a housing;

a display device supported by the housing;

a plurality of input devices supported by the housing, the plurality of input devices at least one of a currency acceptor, a ticket acceptor, and a coin acceptor and at least one of: a touch screen and at least one button; a ticket printer for printing a ticket that reflects the balance of game play credits on the gaming device responsive to activation of an actuator associated with the gaming device; and an electronic processing device supported by the housing, the electronic processing device configured to operate with the display device and the plurality of input devices to: receive a monetary value that is reflected on a credit meter associated with the gaming device, receive, via at least one of the plurality of input devices, a wager based at least in part on the monetary value, the method comprising:

generating a graphical indication on a display on the display device at each of the connected gaming devices that indicates movement of an icon between a start position and an end position, the mystery jackpot being awarded at least when the icon reaches the end position;

animating the icon each time a wager is made at one of the gaming devices;

moving the icon toward the end position as wagers are made at the gaming devices:

animating the icon in a first manner on each screen when a game is initiated that indicates the game outcome is a winning outcome and animating the icon in a second manner when a game is initiated that indicates the game outcome is a losing outcome, display of the first manner being substantially longer than for the second manner, wherein the first and second manners of animation are displayed before the outcome of the game on the one gaming device; and animating the icon in a third manner on each screen when one of the gaming devices triggers the mystery jackpot award; and displaying the outcome of a winning game on the one gaming device for a substantially longer time than displaying the outcome of a losing game.

* * * * *